United States Patent [19]

Pralus

[11] Patent Number: 4,636,368
[45] Date of Patent: Jan. 13, 1987

[54] STABILIZED ACIDIC AQUEOUS SOLUTIONS CONTAINING HYDROGEN PEROXIDE AND METALLIC IONS AND PROCESSES

[75] Inventor: Christian Pralus, Saint Cyr au Mont D'Or, France

[73] Assignee: Atochem, France

[21] Appl. No.: 723,970

[22] Filed: Apr. 17, 1985

[30] Foreign Application Priority Data

May 4, 1984 [FR] France .................................. 84 07174

[51] Int. Cl.$^4$ ....................... C01B 15/02; C01G 43/01
[52] U.S. Cl. ........................................... 423/16; 134/6; 134/7; 134/22.13; 423/272; 423/273
[58] Field of Search ..................... 423/272, 273, 16; 252/186.29; 134/6, 7, 22.13

[56] References Cited

U.S. PATENT DOCUMENTS

| | | | |
|---|---|---|---|
| 3,947,374 | 3/1976 | Loffelman et al. | 423/272 |
| 3,986,971 | 10/1976 | Loffelman et al. | 423/272 |
| 4,120,811 | 10/1978 | Yagi et al. | 252/186.29 |

FOREIGN PATENT DOCUMENTS

2106086  4/1983  United Kingdom ............... 423/272

Primary Examiner—John Doll
Assistant Examiner—Wayne A. Langel
Attorney, Agent, or Firm—Sigalos & Levine

[57] ABSTRACT

A stabilized acidic aqueous composition comprising hydrogen peroxide, metallic ions, and 3-amino-1,2,4-triazine, said triazine being present in an amount sufficient to improve the stability of said composition against decomposition of said peroxide and the methods of utilizing such composition to treat metallic surfaces and to precipitate hydrated uranium peroxide from a solution containing uranium dissolved therein.

6 Claims, No Drawings

STABILIZED ACIDIC AQUEOUS SOLUTIONS CONTAINING HYDROGEN PEROXIDE AND METALLIC IONS AND PROCESSES

BACKGROUND OF THE INVENTION

The present invention concerns the stabilization of hydrogen peroxide in acidic aqueous compositions containing metallic ions. The acid or acids present in such compositions can be partially in the form of salts.

Such solutions find application particularly in the surface treatment of metals, like scouring, polishing and chemical attack of stainless steels or of copper, or in the manufacture of hydrated uranium peroxide.

These solutions are unstable both during their employment and while at rest, with the metallic ions which they contain catalyzing the decomposition of the hydrogen peroxide.

Remedies have been proposed in order to reduce the rate of this decomposition of the hydrogen peroxide in solutions of the same type, but have not been entirely successful.

For instance, British Pat. No. 1,164,347 proposes the addition of one or more saturated aliphatic alcohols to an aqueous solution of hydrogen peroxide containing hydrofluoric acid, used for the chemical polishing of copper and its alloys.

U.S. Pat. No. 3,537,926 recommends the addition of a carboxylic or dicarboxylic aromatic acid, such as benzoic acid, to acidic aqueous solutions containing hydrogen peroxide and ammonium bifluoride (HF, NH$_4$F) used for the polishing of iron alloys.

The Japanese patent application, Japan Kokai No. 73 52638 claims the addition of urea and an inorganic acid to aqueous solutions of hydrogen peroxide containing hydrofluoric acid or its salts, used for the polishing of iron and steels.

French patent application No. 81 17757 published under number 2,513,258 recommends the use of 3-amino-1,2,4-triazole in order to stabilize aqueous solutions of hydrogen peroxide containing metallic ions and one or more acids if necessary, such as sulfuric acid and phosphoric acid.

The remedies stated above in order to improve the stability of such solutions present the drawback of still being insufficiently efficacious and/or having harmful consequences for the environment.

SUMMARY OF THE INVENTION

The present invention alleviates these drawbacks and provides compositions markedly stabilized against decomposition of hydrogen peroxide.

Briefly, the present invention is directed to a stabilized acidic aqueous composition comprising hydrogen peroxide, metallic ions, and 3-amino-1,2,4-triazine, said triazine being present in an amount sufficient to improve the stability of said composition against decomposition of said peroxide.

The invention also comprises the processes of treating metallic surfaces and of precipitating hydrated uranium peroxide from a solution containing uranium dissolved therein as more fully set forth below.

DETAILED DESCRIPTION

The compositions of the present invention are acidic aqueous solutions used for treating metalic surfaces such as iron, iron alloys, various steels, copper, copper alloys, and the like. As used herein the term "treating" means the scouring, polishing, or chemical attack of such metal surfaces.

The respective concentrations of hydrogen peroxide and of the acid, acids, or acid salts in the aqueous solutions to which the invention applies are those customarily used for solutions of this type serving for the surface treatment of metals or for the preparation of hydrated uranium peroxide. Generally speaking, the concentration of the hydrogen peroxide in such solutions can go to 150 grams per liter, while the concentration of the acid or acids generally does not exceed 300 g/l. With respect to the metallic ions, those used are also those conventionally used for these purposes such as iron, chromium, manganese, nickel, copper, and mixtures thereof and in their usual proportion. The acids most often accompanying the hydrogen peroxide in the solutions concerned by the invention are mineral acids such as sulfuric acid, phosphoric acid, and hydrofluoric acid and their soluble salts.

The stabilizing compound used is 3-amino-1,2,4-triazine and it is used in an amount sufficient to improve the stability of the solution against decomposition of the hydrogen peroxide. Such amount will vary dependent in great part upon the concentration of the peroxide and metallic ions also in the solution, but an amount up to about 2 grams per liter; and often up to only about 1 gram per liter, is sufficient to give the desired stability. The optimum concentration for any given solution can be determined by adding varying amounts of the triazine to samples of the solution and noting the mean rate of hydrogen peroxide decomposition as set forth in Example 1 below.

The compositions of the present invention are also effective in ensuring the almost quantitative precipitation of hydrated uranium peroxide from solutions containing uranium in solution. Again the amount of triazine used is up to about 2 grams per liter.

The treatment of metallic surfaces or precipitation of uranium can be carried out at any temperature, but preferably about 40° C. The treatment time can vary widely dependent upon the degree of cleaning, polishing, and the like desired or when the desired amount of uranium peroxide has been precipitated.

EXAMPLE 1

To an aqueous solution containing 1% by weight of hydrogen peroxide, hydrofluoric acid corresponding to 38.7 g/l of total fluorine, 5.1 g/l of total iron, 1 g/l of total chromium, 0.03 g/l of total manganese, 0.02 g/l of total nickel, and 0.003 g/l of total copper, and for which the mean rate of decomposition of the hydrogen peroxide, determined at 40° C. over an interval of 1 hour, amounts to 0.53 millimole per minute and per liter, one adds 3-amino-1,2,4-triazine so as to have 1 gram of this compound per liter of solution. The mean rate of decomposition of the hydrogen peroxide, measured as above, amounts to 0.12 millimole per minute and per liter, thus about 4.5 times smaller than the one observed without addition of the stabilizer.

EXAMPLE 2

To an aqueous solution containing 1% by weight of hydrogen peroxide, hydrofluoric acid corresponding to 45.2 g/l of total fluorine, 14.5 g/l of total iron, 3.9 g/l of total chromium, 0.07 g/l of total manganese, 0.04 g/l of total nickel, and 0.007 g/l of total copper, for which the mean rate of decomposition of the oxygenated water, measured as in Example 1, amounts to 0.93 millimole per minute and per liter, one adds 3-amino-1,2,4-triazine so as to have 0.1 g of this compound per liter of solution.

The mean rate of decomposition of the hydrogen peroxide, determined as in Example 1 is but 0.34 millimole per minute and per liter; i.e., about three times smaller than the one observed without addition of the stabilizer.

EXAMPLE 3

By proceeding as in Example 2, but in the presence of 1 g/l of 3-amino-1,2,4-triazine, the mean rate of decomposition of the hydrogen peroxide, measured as in Example 1, is but 0.14 millimole per minute and per liter of solution or 6 times smaller than the one observed in the absence of the stabilizer.

EXAMPLE 4

To an aqueous solution containing 1% by weight of hydrogen peroxide, 40.4 g/l of free hydrofluoric acid, 65.9 g/l of total iron, 12.9 g/l of total chromium, 0.67 g/l of total manganese, 0.2 g/l of total nickel, and 0.04 g/l of total copper, for which the mean rate of decomposition of oxygenated water, measured as in Example 1, amounts to 2.6 millimoles per minute and per liter, one adds 3-amino-1,2,4-triazine so as to have 1 gram of this compound per liter of solution.

The means rate of decomposition of the hydrogen peroxide, determined as in Example 1, is but 0.58 millimole per minute and per liter; i.e., about 4.5 times smaller than the one observed without addition of the stabilizer.

By way of comparison, the use of 3-amino-1,2,4-triazole under the same conditions only procures an effect two times smaller than the one of the stabilizer according to the invention.

EXAMPLE 5

By proceeding as in Example 4, but at a temperature of 26° C., the mean rate of decomposition of the hydrogen peroxide amounts to 0.09 millimole per minute and per liter in the presence of 1 gram of 3-amino-1,2,4-triazine, while it is 8 times greater at this temperature in the absence of the stabilizer.

EXAMPLE 6

To an aqueous solution containing 10% by weight of hydrogen peroxide, hydrofluoric acid corresponding to 43.7 g/l of total fluorine, and 16.8 g/l of total copper, one adds 3-amino-1,2,4-triazine so as to have 1 gram of this compound per liter of solution. 67% of the hydrogen peroxide initially present in the solution is decomposed after 20 hours at 40° C., whereas under the same conditions this percentage of decomposition is reached already after 6 hours in the absence of stabilizer.

EXAMPLE 7

To an aqueous solution containing 10% by weight of hydrogen peroxide 185 g/l of sulfuric acid and 33.6 g/l of phosphoric acid, one adds 3-amino-1,2,4-triazine so as to have 1 gram of this compound per liter of solution. After 20 hours at 40° C., 8.5% of the hydrogen peroxide initially present in the solution is decomposed, whereas, the same degree of decomposition is reached in 2 hours in the absence of the stabilizer.

EXAMPLE 8

In order to ensure the practically quantitative precipitation of uranium in the form of hydrated peroxide in an acidic aqueous medium, it is necessary to proceed in the presence of an excess of hydrogen peroxide and to avoid the decomposition of the latter.

In order to illustrate the stabilizing effect of the 3-amino-1,2,4-triazine during the course of such an operation, the decomposition of the hydrogen peroxide present at a concentraton of 2% by weight in an aqueous medium of a pH equal to 3.5 and containing, in the form of salts, 53 mg/l of manganese, 16 mg/l of uranium, 4.5 mg/l of molybdenum, 2 mg/l of copper, 0.8 mg/l of iron and 0.1 mg/l of chromium, has been followed at 40° C. in the presence of 1 gram of stabilizer per liter of such a medium.

The mean rate of decomposition of the hydrogen peroxide determined as in Example 1 amounts to only 0.1 millimole per minute and per liter of solution instead of 0.9 millimole per minute and per liter in the absence of the stabilizer.

By way of comparison, the effect of 3-amino-1,2,4-triazole is two times smaller than the effect of 3-amino-1,2,4-triazine at equal quantities of stabilizer used.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A stabilized acidic aqueous composition comprising hydrogen peroxide, metallic ions, and 3-amino-1,2,4-triazine, said triazine being present in an amount sufficient to improve the stability of said composition against decomposition of said peroxide.

2. The composition of claim 1 wherein said triazine is present in an amount up to about 2 grams per liter of said composition.

3. The composition of claim 1 or 2 wherein said peroxide is present in an amount up to about 150 grams per liter of composition and said composition contains an acid present in an amount up to about 300 grams per liter of composition.

4. The composition of claim 3 wherein said acid is a mineral acid selected from sulfuric acid, phosphoric acid, or hydrofluoric acid.

5. The method of treating a metal surface comprising applying thereto the composition of claim 1, 2, 3, or 4 in an amount sufficient and for a time and at a temperature sufficient to effect such treatment.

6. The method of precipitating hydrated uranium peroxide from a solution containing uranium dissolved therein comprising adding thereto the composition of claim 1, 2, 3, or 4 in an amount sufficient and for a time and at a temperature sufficient to precipitate said uranium peroxide.

* * * * *